United States Patent
Bach

(10) Patent No.: US 8,514,382 B2
(45) Date of Patent: Aug. 20, 2013

(54) OPTICAL DEVICE AND METHOD FOR MEASURING THE ROTATION OF AN OBJECT

(75) Inventor: Olivier Bach, Audenge (FR)

(73) Assignee: Commissariat a l'Energie Atomique et aux Energies Alternatives, Paris (FR)

( * ) Notice: Subject to any disclaimer, the term of this patent is extended or adjusted under 35 U.S.C. 154(b) by 309 days.

(21) Appl. No.: 13/055,261

(22) PCT Filed: Jul. 24, 2009

(86) PCT No.: PCT/FR2009/051496
§ 371 (c)(1),
(2), (4) Date: Jan. 21, 2011

(87) PCT Pub. No.: WO2010/010311
PCT Pub. Date: Jan. 28, 2010

(65) Prior Publication Data
US 2011/0126631 A1   Jun. 2, 2011

(30) Foreign Application Priority Data

Jul. 24, 2008 (FR) ..................................... 08 55066

(51) Int. Cl.
*G01N 21/41* (2006.01)
(52) U.S. Cl.
USPC ............... 356/136; 356/139.1; 356/141.1; 356/141.4; 356/153; 356/400; 250/559.3
(58) Field of Classification Search
USPC .............................. 356/614, 136, 139.1, 400
See application file for complete search history.

(56) References Cited

U.S. PATENT DOCUMENTS

| | | | |
|---|---|---|---|
| 4,721,386 A * | 1/1988 | Collyer | 356/139.03 |
| 4,939,678 A | 7/1990 | Beckwith, Jr. | |
| 5,028,137 A * | 7/1991 | Sommargren et al. | 356/510 |
| 5,896,200 A * | 4/1999 | Shu | 356/614 |
| 6,038,050 A * | 3/2000 | Hamar | 359/196.1 |
| 6,515,294 B1 | 2/2003 | Busch et al. | |

FOREIGN PATENT DOCUMENTS
EP    1037013    9/2000

OTHER PUBLICATIONS

International search report dated Feb. 2, 2010 in corresponding PCT/FR2009/051496.

* cited by examiner

*Primary Examiner* — Tarifur Chowdhury
*Assistant Examiner* — Isiaka Akanbi
(74) *Attorney, Agent, or Firm* — Young & Thompson

(57) ABSTRACT

A method and optical device measures the rotation of an object, including a light source emitting a collimated incident light beam, and a reflecting plane optical interface to be fastened to the object and forming a first reflected beam. The device includes a corner reflector fastened to the object, and having reflecting plane faces forming a second reflected beam, and a detection system capable of measuring the displacement $\Delta_1$ of the first reflected beam, and the displacement $\Delta_2$ of the second reflected beam. A processing system calculates, as a function of $\Delta_1$ and of the distance $D_1$ between the detection system and the reflecting plane optical interface, and of the measurement of $\Delta_2$ and of the distance $D_2$ between the detection system and the corner reflector, a measurement of the rotation $\alpha$ of the object between an initial position and a measurement position.

17 Claims, 4 Drawing Sheets

OPTICAL DEVICE AND METHOD FOR MEASURING THE ROTATION OF AN OBJECT

BACKGROUND OF THE INVENTION

1. Field of the Invention

The present invention relates to an optical device and a method for measuring the rotation and/or the rotational vibrations of an object.

More particularly, the invention relates to an optical device and a method for measuring the rotations or rotational vibrations of an object, wherein the rotations are of low angular amplitude at least of the order of 0.1 micro-radian) and the vibration frequencies thereof can reach several hundreds of Hertz.

2. Description of the Related Art

Indeed, it is important to be able to measure the very low amplitude rotations and/or rotational vibrations of certain objects. For example, on a very long laser chain, the rotational vibrations of components coming in the optical alignment may produce amplified vibrations of the beams and make the alignment very difficult to get. To identify the source of the mechanical vibrations and to remedy them, it is important to measure the amplitude of the rotational vibrations and, if needed, to analyze the frequency spectrum thereof.

Various categories of devices permit to more or less directly obtain a measurement of rotation and/or rotational vibrations of an object.

A first category of devices uses several accelerometers that provide translation measurements, from which is deduced an indirect rotation measurement. A first method is based on the numerical adjustment of the parameters of a mechanical model to obtain an optimized simulation of the translational vibrations compared to the measurements. The thus-determined mechanical model is then used to calculate an estimate of the rotations. Although the mechanical models are often simplified with respect to the reality, the numerical adjustments need relatively long and costly calculation times. A second method uses the translational vibration measurements of several accelerometers whose readings are synchronized. The differential measurement of the displacements divided by the distance between the sensors permits to deduce the angular vibrations as a function of time. However, the accuracy of measurement is related to the spacing between the sensors. This minimal spacing required is difficult to implement for small size objects. Moreover, the sensors can be inopportunely placed at positions that are insensitive to certain natural modes of vibration of the object (the vibration nodes).

A second category of rotation measuring device is based on the use of an autocollimation optical method illustrated in FIG. 1. An autocollimator telescope 1 comprises a source 4 and a position sensor 7. The collimated beam 8 of the source is directed at normal incidence to a reflecting plane face 3 of the object 2 or to a flat mirror fastened to the object to be measured.

In a known manner, when the reflecting face 3 undergoes a rotation of an angle θ, the reflected beam 9 undergoes an angular deviation 2θ. A position sensor 7 placed at the telescope focal point permits to measure the deviation of the reflected beam projected on the sensor 11, induced by a rotation of the object with respect to an initial position of the projected reflected beam 10. The distance from the telescope to the object being known, the measurement of the reflected beam displacement permits to directly calculate the corresponding rotation angle of the object. The measurement accuracy is a function of the distance between the object and the autocollimator telescope.

However, the rotation measurement obtained by an autocollimator telescope is not an absolute measurement of the object rotations, but only a relative measurement of the rotations between the object and the telescope. Indeed, it is not possible to make the difference between the movements of the telescope and those of the object. Ensuring the stability of the telescope is thus a major stake, which is difficult or even impossible to realize for the measurement of stable objects whose movements are low in amplitude or when it is impossible to isolate the telescope from the ambient vibrations.

SUMMARY OF THE INVENTION

The present invention aims to remedy these drawbacks and relates more particularly to a device and a method for measuring the rotation and/or the rotational vibrations of an object.

The invention relates to an optical device for measuring the rotation of an object, comprising a light source capable of emitting a collimated incident light beam propagating in an incident direction, and a reflecting plane optical interface intended to be fastened to the object, the rotation of which it is desired to measure, and capable of forming a first reflected beam. According to the invention, the device comprises a cube-corner retroreflector intended to be fastened to the object, said cube corner comprising reflecting plane faces capable of forming a second reflected beam in a direction parallel to the incident direction, a sensing system capable of measuring, on the one hand, the displacement $\Delta_1$ of the first reflected beam, reflected by the reflecting plane optical interface and, on the other hand, the displacement $\Delta_2$ of the second reflected beam, reflected by the reflecting faces of the cube corner, the displacements $\Delta_1$ and $\Delta_2$ being respectively measured with respect to an initial position of the first reflected beam and of the second reflected beam, and a processing system capable of calculating, as a function, on the one hand, of the measurement of the displacement $\Delta_1$ and of the distance $D_1$ between the sensing system and the reflecting plane optical interface and, on the other hand, of the measurement of the displacement $\Delta_2$ and of the distance $D_2$ between the sensing system and the cube corner, a measurement of the rotation α of the object between an initial position and a measurement position.

According to a first embodiment of the invention, the cube corner is an advantageously solid half-cube comprising three reflecting plane faces and the fourth face of which constitutes the reflecting plane optical interface.

According to another embodiment, the rotation measuring device comprises a reflecting plane optical interface and a beam splitter capable of angularly separating the incident beam, on the one hand, into a collimated beam directed toward the plane optical interface and, on the other hand, into a collimated beam directed toward the cube corner.

According to a particular embodiment, the sensing system comprises a first position sensor capable of measuring the displacement $\Delta_1$ of the first reflected beam and a second position sensor capable of measuring the displacement $\Delta_2$ of the second reflected beam between an initial position and a measurement position.

According to a particular embodiment, the sensing system comprises a CCD matrix capable of measuring the displacement $\Delta_1$ of the first reflected beam and the displacement $\Delta_2$ of the second reflected beam between an initial position and a measurement position.

According to a particular embodiment, the sensing system is capable of measuring respectively the displacement $\Delta_1$ of the first reflected beam and the displacement $\Delta_2$ of the second reflected beam in two transverse directions (X, Y), to deduce therefrom the measurements of rotation of the object according to two axes of rotation, respectively.

According to a particular embodiment of the invention, the device for measuring the rotation of an object comprises an accelerometer intended to be fastened to the object and a data processing system capable of calculating from the measurements provided by said accelerometer and the measurement of the displacements $\Delta_1$ and $\Delta_2$ of the beams reflected by the plane optical interface and the cube corner, respectively, a measurement of rotation of the object corrected by the translation.

According to a particular embodiment, the sensing system is capable of collecting, on the one hand, a series of measurements of the displacement $\Delta_1$ of the reflected beam at a series of instants $t_i$, $_{i=1,\ldots,N}$ and, on the other hand, a series of measurements of the displacement $\Delta_2$ of the reflected beam at a series of instants $t_i$, and in that the processing system is capable of applying a Fourier transform operation to these series of temporal measurements $\Delta_1(t_i)$ and $\Delta_2(t_i)$, to obtain a measurement of the spectral density of the rotational vibrations of the object as a function of the frequency of these vibrations.

According to a particular embodiment, the processing system is capable of sensing the amplitude and resonance frequencies in the rotational vibration spectrum of the object from the spectral density measured.

The invention also relates to a method for optically measuring the rotation of an object, comprising the following steps:
 fastening a cube corner to the object, the cube corner comprising reflecting plane faces,
 fastening a reflecting plane optical interface to the object,
 directing a collimated incident light beam, on the one hand, to the reflecting plane optical interface to form a first reflected beam and, on the other hand, to the cube corner to form a second reflected beam in a direction parallel to the incident direction,
 detecting the initial position of the point of impact of the first reflected beam, reflected by the plane optical interface, on a sensor,
 detecting the position of the point of impact of the second reflected beam, reflected by the reflective plane faces, on a sensor,
 measuring the respective displacements $\Delta_1$ and $\Delta_2$ of the reflected beams between an initial position and a measurement position,
 calculating an arithmetic function of $\Delta_1$ and $\Delta_2$,
 deducing a measurement of rotation of the object carrying the cube corner.

The invention also relates to an optical measurement of the rotational vibrations of an object, comprising the following steps:
 measuring the respective displacements $\Delta_1$ and $\Delta_2$ of the reflected beams according to the rotation measuring method, at a series of measurement instants $t_i$, and
 applying a Fourier transform operation to these series of temporal measurements [$\Delta_1(t_i)$; $\Delta_2(t_i)$] to obtain a spectrum of the rotational vibrations of the object as a function of the frequency.

The invention will find a particularly advantageous application in measuring the rotation amplitude, the rotational vibration amplitude and the rotational vibration frequency density of optical component supports in a very long laser chain.

The present invention also relates to the features that will become evident in the following description and that will have to be considered either alone or in any technically possible combination.

BRIEF DESCRIPTION OF THE DRAWING FIGURES

The present description is given only by way of non-limitative example and will permit to better understand how the invention can be implemented with reference to the appended drawings, in which:

FIG. 1 schematically shows the principle of use of an autocollimator telescope;

DETAILED DESCRIPTION OF THE INVENTION

Figure 1:
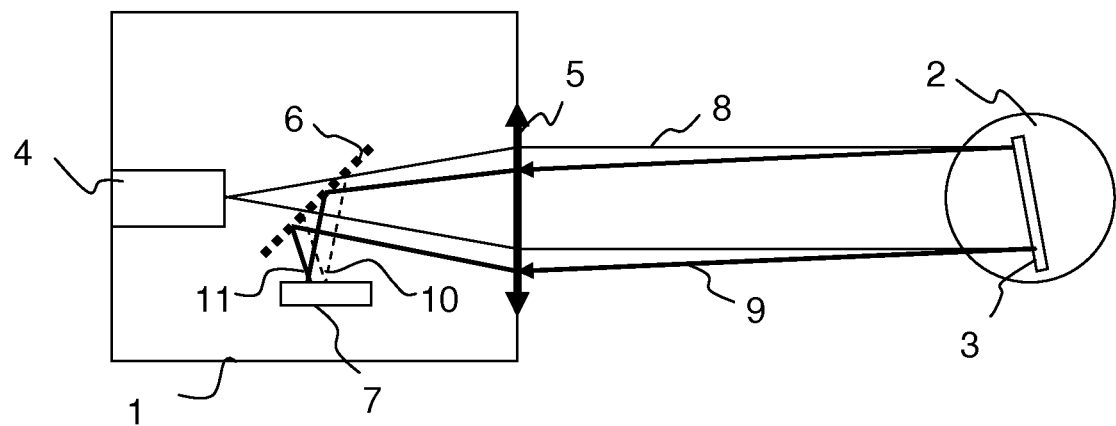
Figure 2:
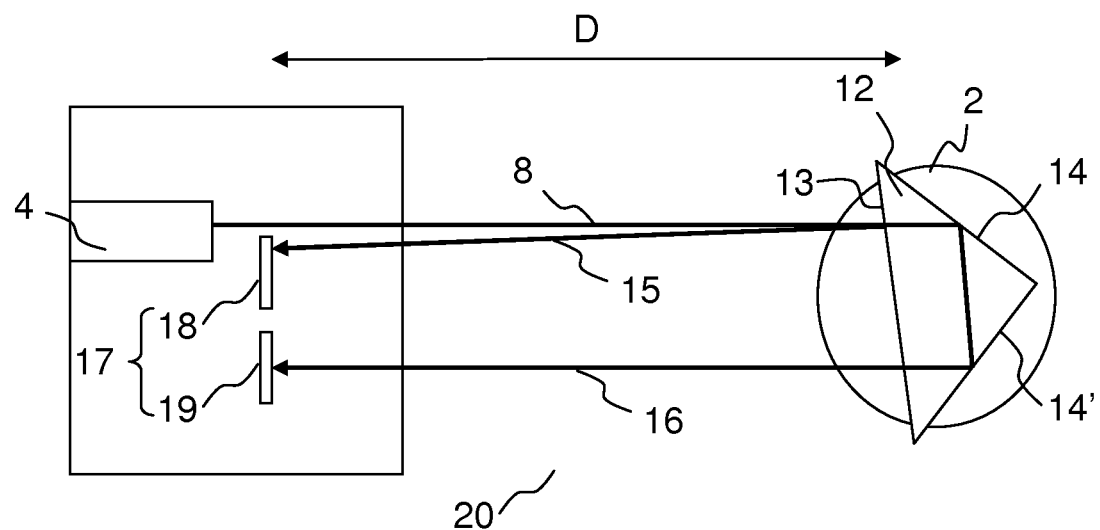
FIG. 2 shows a first embodiment of a rotation measuring device according to the invention.

A first embodiment of a device according to the invention is shown in FIG. 2. The device 20 comprises, on the one hand, a light emitting-receiving unit and, on the other hand, a cube-corner retroreflector 12. The emitting-receiving unit comprises a light source 4 and a sensing system 17. This unit may also comprise a collimating optical system and a half-reflecting plate. The source 4 emits a collimated incident beam 8 propagating in an incident direction. The cube corner 12 is fastened to the object, the rotation and/or rotational vibrations of which it is desired to measure. The cube corner comprises a plane optical interface 13 and reflecting faces 14, 14', 14". The cube corner is generally a tetrahedron, three faces 14, 14', 14" of which are perpendicular to each other. The beam 8 incident on the plane optical interface 13 of the cube corner is partially reflected and partially transmitted inside the cube corner. The beam partially reflected on the optical interface 13 forms a first reflected beam 15. The beam transmitted inside the cube corner is reflected by the reflecting faces 14, 14', 14" and goes out of the cube through the input-output optical interface, in the form of a reflected beam 16 propagating in a direction parallel to the incident beam direction, according to a known property of the cube corner. The sensing system 17 comprises a first sensor 18 that measures the displacement $\Delta_1$ (amplitude and sign) of the first reflected beam and a second sensor 19 that measures the displacement $\Delta_2$ of the second reflected beam at an instant t. The signs of the displacements $\Delta_1$ and $\Delta_2$ are defined by convention at the beginning. A processing system (not shown) collects the measurements of $\Delta_1$ and $\Delta_2$ and applies to them a mathematical processing that is a function of $\Delta_1$ and $\Delta_2$, of the sum ($\Delta_1+\Delta_2$) and/or of the difference ($\Delta_1-\Delta_2$), and of the distance D between the cube corner 12 and the sensing system 17.

The cube corner is a tetrahedron. If the cube corner is made of glass, the intensity of the $1^{st}$ reflected beam is of the order of 4% of the intensity of the beam 8, and the intensity of the $2^{nd}$ reflected beam is of the order of 92 thereof. In such conditions, the signal-to-noise ratio of the measurement of $\Delta_1$ is far lower than that of the measurement of $\Delta_2$. The input-output optical interface 13 may comprise a semi-reflecting treatment to improve the dynamics by balancing the intensity of the two reflected beams.

Figure 3:
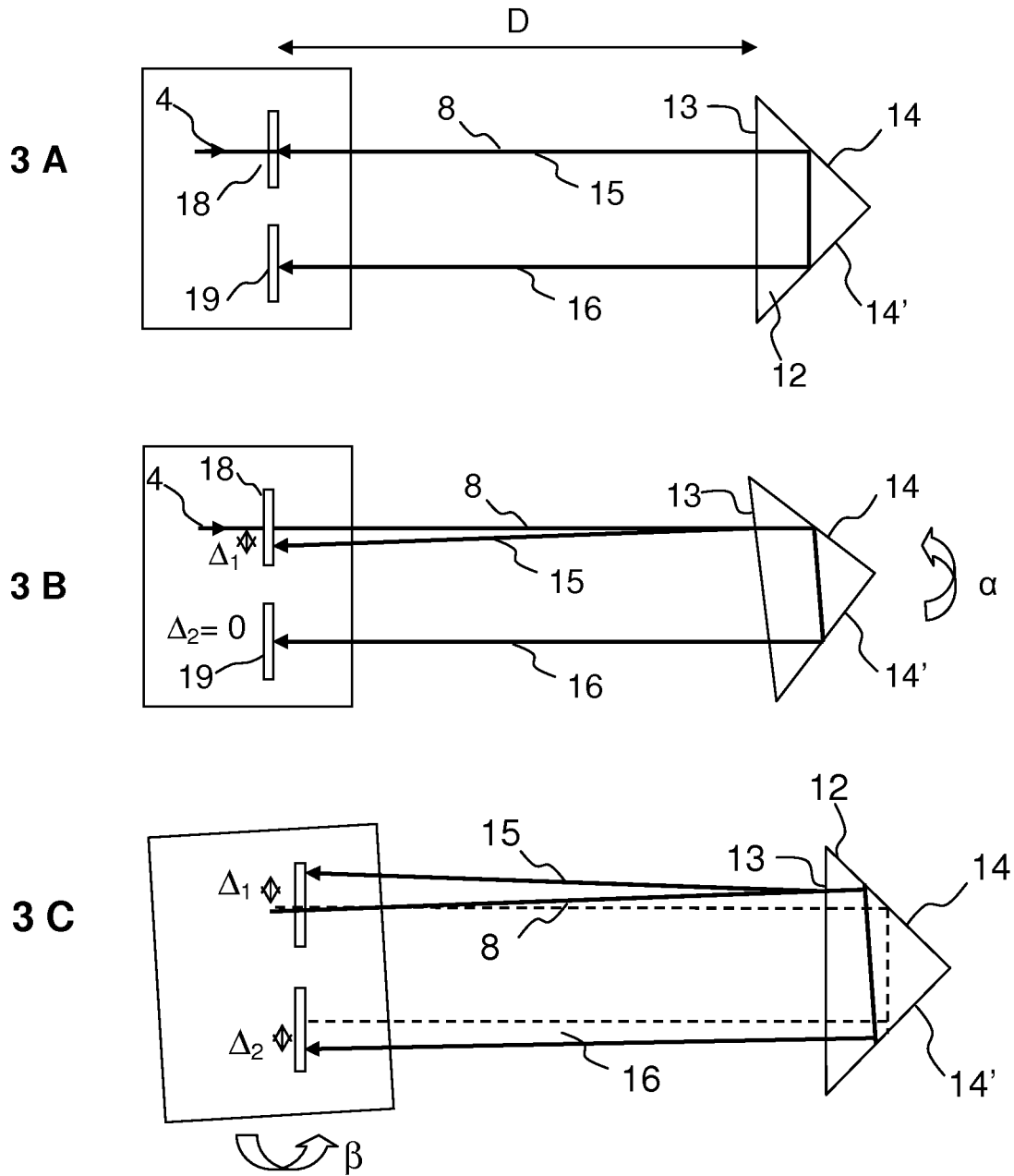
FIG. 3 shows a rotation measuring device in the initial position (FIG. 3A), in case of rotation of the object (3B) and in case of rotation of the source-sensor unit (3C)

The principle of operation of the invention will now be described in relation to FIG. 3. FIG. 3A shows the device in autocollimation position, which, for the purpose of explanation, is considered as a reference initial position. The collimated incident beam 8 reaches the plane optical interface 13 at normal incidence: the first reflected beam 15 is superimposed to the incident beam, propagating in the reverse direction, and the second beam 16 is reflected parallel thereto. FIG. 3B shows the effect of a rotation α of the cube corner 12: the $2^{nd}$ reflected beam 16 produces no angular deviation (property of the cube corner), whereas the $1^{st}$ reflected beam 15 undergoes an angular deviation of 2.α. The rotation angles α being very low, the distance D between the sensing system 17 and the cube corner 13 is almost invariant at the $1^{st}$ order and the displacement of the beam 15 on the sensor can be approached by a formula such as $\Delta_1=2.\alpha.D$, whereas $\Delta_2=0$.

FIG. 3C shows the effect of a rotation β of the source 4-sensors 17 unit, without rotation of the cube corner 12. A rotation of an angle β of the source unit involves a deviation of the incident beam 8 of an angle β and an angular deviation of the $1^{st}$ reflected beam 15 of −2.β. On the sensor 17, the $1^{st}$ beam is displaced by $\Delta_1=-2.\beta.D$. The $2^{nd}$ reflected beam 16 is reflected parallel to the incident beam 8 and symmetric with respect to the image of the cube corner apex, viewed through the front face. The $2^{nd}$ reflected beam 16 undergoes a displacement of $\Delta_2=-2.\beta.D$ on the sensor 18.

According to the preferred embodiment of the invention, the arithmetic sum of $\Delta_1$ and $\Delta_2$, divided by the distance D, permits to measure the rotations of the object 2 and to eliminate the parasitic rotations of the source-sensors unit.

The device according to the invention is then sensitive to very low rotations of the object carrying the cube corner, while being insensitive to the rotations of the lighting and measurement unit.

According to a preferred embodiment, the sensors 18 and 19 are two position sensors. Each of the sensors measures the position difference of each beam 15, 16, respectively, with respect to an original position on the sensor. Position sensors (or "Position Sensitive Detectors") deliver a voltage proportional to the position difference. These sensors can be sensitive to the beam deviation in one or preferentially two directions X, Y in a plane transverse to the beam axis. The displacement sign of each beam is calibrated at the beginning. The sensors are preferentially of position sensing technology because it has a fast response time (acquisition frequency 500-1000 Hz for sought vibration frequencies of the order of one hundred of Hertz). A single CCD sensor may also be used for measuring the displacement of the two reflected beams. However, the response of a CCD is more limited in frequency.

A data processing system collects the values of $\Delta_1$ and $\Delta_2$ and calculates the sum of these deviations at an instant t, so as to eliminate the term corresponding to the move of the source.

Figure 5:
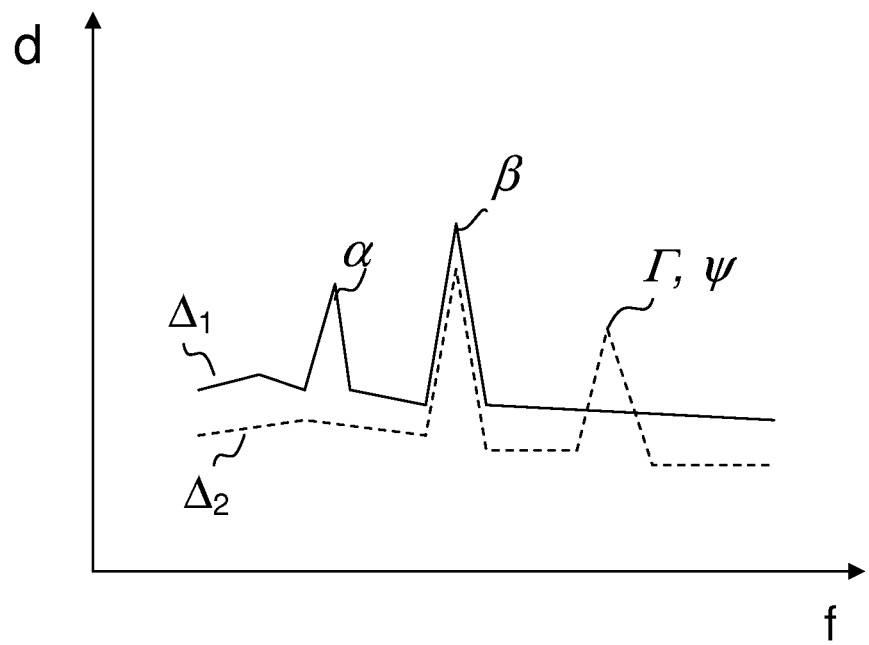
FIG. 5 shows rotational vibration spectra obtained by a method according to the invention.

A series of measurements is generally performed as a function of time, at the acquisition frequency of the sensors 18, 19. A series of points $\Delta_1=(\Delta_1+\Delta_2)_{i=1,\ldots,N}$ at instants $t_i$ is thus obtained. The Fourier transform of the series of temporal measurements $\Delta_1(t_i)$, $\Delta_2(t_i)$, $(\Delta_1+\Delta_2)(t_i)$ permits to obtain a frequency spectrum of the rotational vibrations of the cube corner. FIG. 5 shows curves of typical spectral densities so obtained for $\Delta_1$, $\Delta_2$ and $(\Delta_1+\Delta_2)$. These curves have vibration peaks corresponding to resonance frequencies. The curve corresponding to $\Delta_1$ has a first peak corresponding to rotational vibrations of the object and a second peak corresponding to rotational vibrations of the telescope. The curve corresponding to $\Delta_2$ is insensitive to the object rotations, but has a peak corresponding to rotational vibrations of the telescope and another peak corresponding to a translation of the sensing system and/or of the object. The difference between the spectral densities of $\Delta_1$ and $\Delta_2$ has a first peak corresponding to the rotational vibrations of the object and another peak corresponding to translational vibrations. The curves of FIG. 5 then permit to identify resonance frequencies and the relative amplitude thereof.

Figure 4:
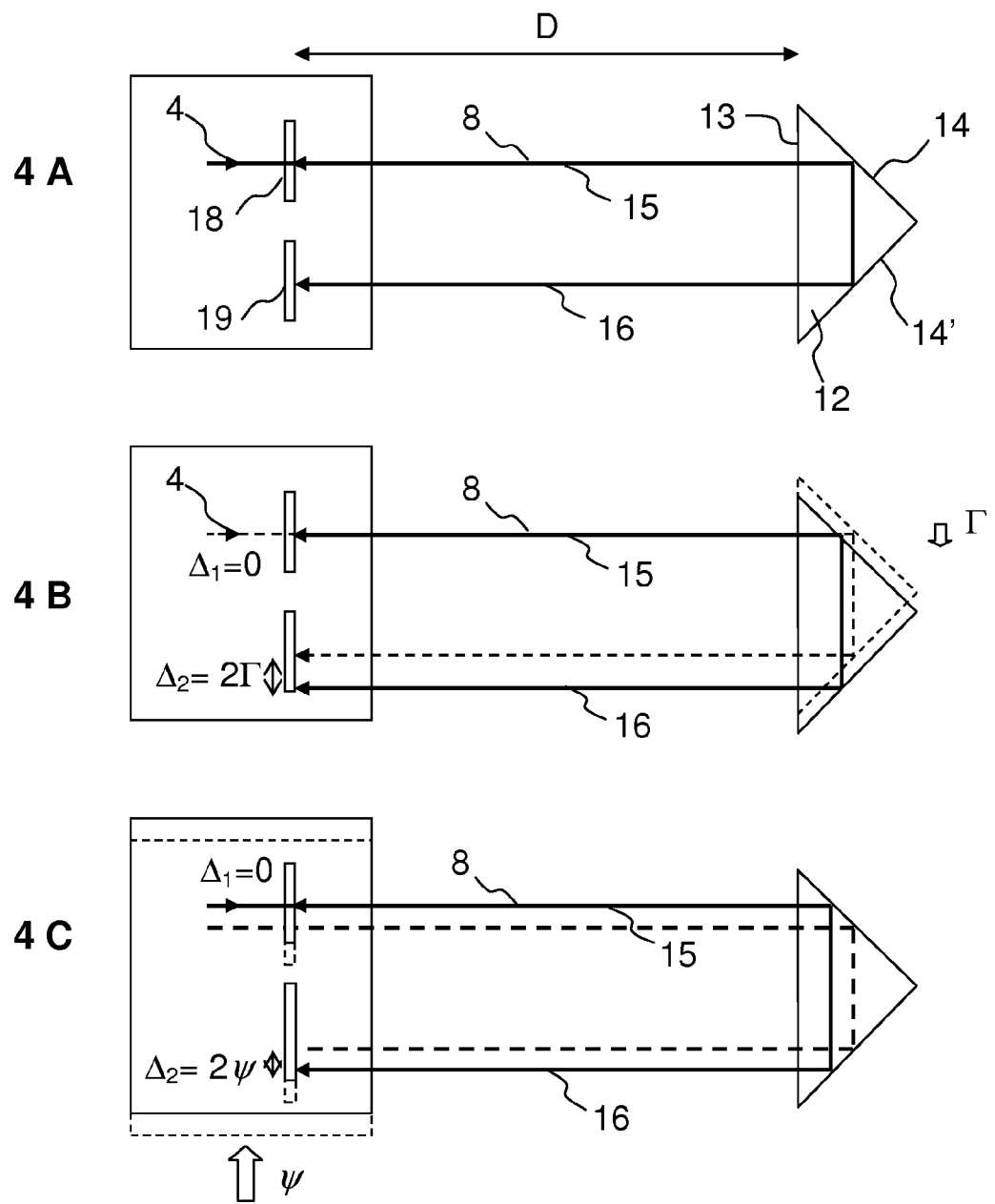
FIG. 4 shows a rotation measuring device in the initial position (FIG. 4A), in case of translation of the object (4B) and in case of translation of the source-sensor unit (4C)

A drawback of the above-described first embodiment of the invention is the sensitivity thereof to the parasitic translations of the cube corner and/or of the source-sensor unit. FIG. 4 illustrates examples of translation and the effects thereof on the measurements. FIG. 4A shows the device of the invention in autocollimation position. FIG. 4B shows the effect of a translation Γ of the cube corner 12: the $1^{st}$ reflected beam 15 undergoes no angular deviation, whereas the $2^{nd}$ reflected beam 16 undergoes a shift of 2.Γ. The displacement of the beam 16 on the sensor is $\Delta_2=2.\Gamma$, whereas $\Delta_1=0$.

FIG. 4C shows the effect of a translation Ψ of the source-sensor unit, without translation of the cube corner 13. A translation of amplitude Ψ of the source 4 involves a translation of the point of impact of the incident beam 8 on the cube corner. The sensor 17 being fastened to the source 4, the sensor measures no apparent displacement $\Delta_1=0$. The $2^{nd}$ reflected beam 16 is reflected parallel to the incident beam 8 and with a displacement on the sensor 18 of $\Delta_2=2.\Psi$.

Neither the addition nor the subtraction of $\Delta_1$ and $\Delta_2$ permits to eliminate the effect of these translations or of translational vibrations on the measurements. However, the resonance frequencies of the rotational and translational vibration modes are different from each other (cf. FIG. 5) and can then be identified.

In order to limit the relative importance of the translational vibrations with respect to the rotational vibrations in the measured signal, it is desirable to increase the sensitivity of the rotation measurement by increasing the distance D between the source-sensor unit and the cube corner, so as to amplify the angular deviations.

According to an alternative embodiment, the rotation measuring device of the invention can be combined with one or several accelerometers measuring the translations of the cube corner and of the source-sensor bloc.

Figure 6:
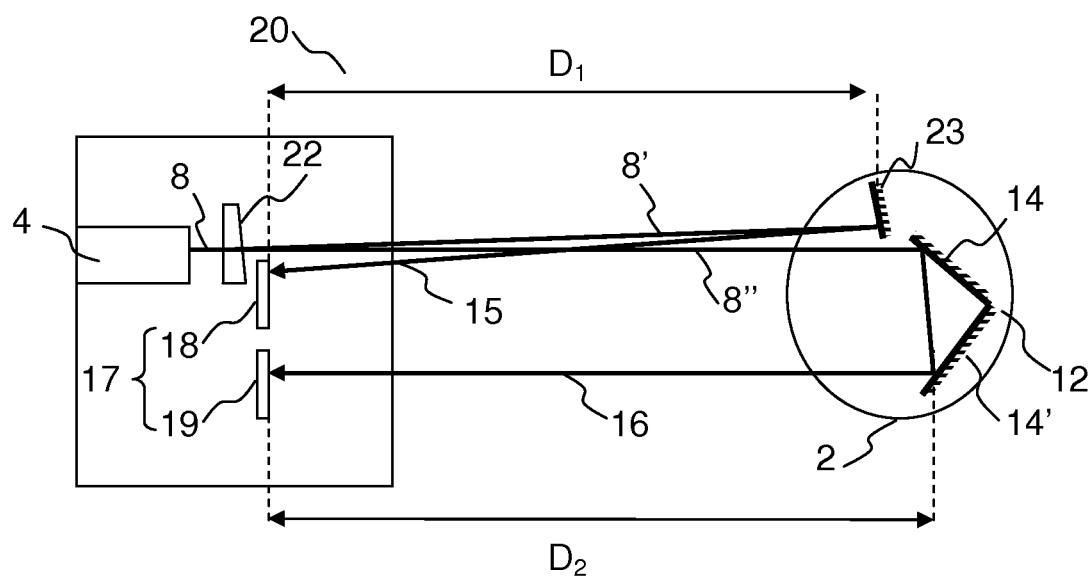
FIG. 6 shows a second embodiment of a rotation measuring device according to the invention.

FIG. 6 shows a second embodiment of the rotation measuring device according to the invention. This embodiment also uses a source 4 emitting a collimated light beam 8 propagating in an incident direction and a cube corner 12 reflecting a portion of the light beam in a direction parallel to the incident direction. The sensing system is similar to that described in relation with the first embodiment of the invention (FIG. 2). However, the second embodiment does not use the reflection on an input-output plane optical interface of the cube corner. The device further comprises a reflecting plane optical interface 23 fastened to the object to be measured and placed near the cube corner. The device comprises a beam splitter capable of angularly separating the incident beam 8 into two collimated beams: on the one hand, a collimated beam 8'' propagating in the incident direction and, on the other hand, a collimated beam 8' propagating in a direction forming an angle with the incident direction. The beam splitter may be, for example, a prismatic plate. The beam 8' is directed toward the plane optical interface 23 and reflected to form a reflected beam 15. The beam 8'' is directed toward the cube corner and reflected by the reflecting faces of the cube corner 12 to form a beam 16 propagating in a direction parallel to the incident direction. The measurement of the displacement $\Delta_1$ of the beam 15 on the sensor 18 and of the displacement $\Delta_2$ of the beam 16 on the sensor 18, respectively, permits, similarly to the first embodiment, to measure the rotations of the object carrying the cube corner 12 and the reflecting plane optical interface 23.

This second embodiment permits to dissociate the initial settings of the two reflected beams. This embodiment also permits to use a hollow cube corner made of three plane mirrors.

The two described embodiments of the invention can use a tetrahedral cube corner, inside which the incident beam generally undergoes three reflections in a three-dimension space, before going out from the cube corner in a direction parallel to the incident direction. A prism can also permit the retroreflection of a collimated beam, by internal reflection on two faces of the prism, the reflected beam being parallel to the incident beam and in the same plane. Those skilled in the art will be able to transpose the invention by replacing the cube corner by a prism. However, the rotation measuring device so obtained permits only a measurement of rotation according to an axis of rotation that is perpendicular to the plane containing the incident and reflected beams.

The invention uses a measuring device and method that permit to eliminate, at the first order, the parasitic rotations of the telescope. The device of the invention uses an optical and thus object-contactless method. The device only requires the installation of a cube corner integral with the movements of the object to be measured. For example, the cube corner can be fixed to the object support. The size of the cube corner can be extremely reduced (a few mm wide). The device uses cheap and easy-to-make components. The device does not necessitate a precise alignment.

The device permits to obtain accurate measurements of rotation of an object. The device provided with a two-dimension sensing system permits to measure the rotations of an object according to two axes of rotation transverse to the axis of the source beam. The device of the invention provides temporal measurements that can be analyzed to obtain a measurement of the rotational vibrations as a function of the frequency.

The invention claimed is:

1. An optical device (20) for measuring rotation of an object (2), comprising:
 a light source (4) emitting a collimated incident light beam (8) propagating in an incident direction;
 a reflecting plane optical interface (13, 23) fastened to the object (2), the rotation of which is desired to measure, and capable of forming a first reflected beam (15);
 a cube-corner retroreflector (12) fastened to the object (2), said cube corner (12) comprising reflecting plane faces (14, 14', 14") forming a second reflected beam (16) in a direction parallel to the incident direction;
 a source-sensor unit comprising the light source (4) and a sensing system (17), the sensing system (17) measuring, a displacement $\Delta_1$ of the first reflected beam (15), reflected by the reflecting plane optical interface (13, 23) and a displacement $\Delta_2$ of the second reflected beam (16), reflected by the reflecting faces (14, 14', 14") of the cube corner (12), the displacements $\Delta_1$ and $\Delta_2$ being respectively measured with respect to an initial position of the first reflected beam (15) and of the second reflected beam (16); and
 a processing system calculating, as a function of the measurement of the displacement $\Delta_1$ and of a distance $D_1$ between the sensing system (17) and the reflecting plane optical interface (13, 23) and of the measurement of the displacement $\Delta_1$ and of a distance $D_2$ between the sensing system (17) and the cube corner (12), a measurement of the rotation $\alpha$ of the object (2) between an initial position and a measurement position, the processing system configured to calculate said measurement of the rotation $\alpha$ as a function of an arithmetic sum of $\Delta_1$ and $\Delta_2$ divided by the distance $D_2$ between the sensing system (17) and the cube corner (12) so that said measurement of the rotation $\alpha$ eliminates parasitic rotation $\beta$ from the source-sensor unit.

2. The device (20) for measuring the rotation of an object according to claim 1, wherein the cube corner (12) is a half-cube comprising three reflecting plane faces (14, 14', 14") and the fourth face of which constitutes the reflecting plane optical interface (13).

3. The device (20) for measuring the rotation of an object according to claim 2, wherein the device further comprises a reflecting plane optical interface (23) and a beam splitter (22) capable of angularly separating the incident beam (8), on the one hand, into a collimated beam (8') directed toward the plane optical interface (23) and, on the other hand, into a collimated beam (8") directed toward the cube corner (12).

4. The device (20) for measuring the rotation of an object according to claim 2, wherein the sensing system (17) comprises a first position sensor (18) capable of measuring the displacement $\Delta_1$ of the first reflected beam (15) and a second position sensor (19) measuring the displacement $\Delta_2$ of the second reflected beam (16) between an initial position and a measurement position.

5. The device (20) for measuring the rotation of an object according to claim 2, wherein the sensing system (17) comprises a CCD matrix capable of measuring the displacement $\Delta_1$ of the first reflected beam (15) and the displacement $\Delta_2$ of the second reflected beam (16) between an initial position and a measurement position.

6. The device (20) for measuring the rotation of an object (2), according to claim 2, wherein the sensing system (17) is measuring respectively the displacement $\Delta_1$ of the first reflected beam (15) and the displacement $\Delta_2$ of the second reflected beam (16) in two transverse directions (X, Y), to deduce therefrom the measurements of rotation of the object (2) according to two axes of rotation, respectively.

7. The device (20) for measuring the rotation of an object (2), according to claim 2, further comprising:
 an accelerometer fastened to the object (2) and
 a data processing system calculating from the measurements provided by said accelerometer and the measurement of the displacements $\Delta_1$ and $\Delta_2$ of the beams reflected by the plane optical interface (13, 23) and the cube corner (12), respectively, a measurement of rotation of the object (2) corrected by the translation.

8. A device for measuring rotational vibrations of an object, comprising the device according to claim 2, wherein the sensing system is collecting, on the one hand, a series of measurements of the displacement $\Delta_1$ of the reflected beam (15) at a series of instants $t_i$, i=1, N and, on the other hand, a series of measurements of the displacement $\Delta_2$ of the reflected beam (16) at a series of instants $t_i$, and in that the processing system is capable of applying a Fourier transform operation to these series of temporal measurements $\Delta_1$ (t) and $\Delta_2$ (t), to obtain a measurement of the spectral density of the rotational vibrations of the object (2) as a function of the frequency of these vibrations.

9. The device (20) for measuring the rotation of an object according to claim 1, wherein the device further comprises a reflecting plane optical interface (23) and a beam splitter (22)

angularly separating the incident beam (8), into a collimated beam (8') directed toward the plane optical interface (23) and, into a collimated beam (8") directed toward the cube corner (12).

10. The device (20) for measuring the rotation of an object according to claim 1, wherein the sensing system (17) comprises a first position sensor (18) capable of measuring the displacement $\Delta_1$ of the first reflected beam (15) and a second position sensor (19) measuring the displacement $\Delta_2$ of the second reflected beam (16) between an initial position and a measurement position.

11. The device (20) for measuring the rotation of an object according to claim 1, wherein the sensing system (17) comprises a CCD matrix capable of measuring the displacement $\Delta_1$ of the first reflected beam (15) and the displacement $\Delta_2$ of the second reflected beam (16) between an initial position and a measurement position.

12. The device (20) for measuring the rotation of an object according to claim 1, wherein the sensing system (17) is capable of measuring respectively the displacement $\Delta_1$ of the first reflected beam (15) and the displacement $\Delta_2$ of the second reflected beam (16) in two transverse directions (X,Y), to deduce therefrom the measurements of rotation of the object (2) according to two axes of rotation, respectively.

13. The device (20) for measuring the rotation of an object according to claim 1, wherein the device further comprises:
an accelerometer fastened to the object (2) and
a data processing system calculating from the measurements provided by said accelerometer and the measurement of the displacements $\Delta_1$ and $\Delta_2$ of the beams reflected by the plane optical interface (13, 23) and the cube corner (12), respectively, a measurement of rotation of the object (2) corrected by the translation.

14. A device for measuring rotational vibrations of an object, comprising a device according to claim 1,
wherein the sensing system is collecting, on the one hand, a series of measurements of the displacement $\Delta_1$ of the reflected beam (15) at a series of instants $t_i$, i=1, ..., N and, on the other hand, a series of measurements of the displacement $\Delta_2$ of the reflected beam (16) at a series of instants $t_i$, and the processing system is applying a Fourier transform operation to these series of temporal measurements $\Delta_1(t)$ and $\Delta_2(t)$, to obtain a measurement of the spectral density of the rotational vibrations of the object (2) as a function of the frequency of these vibrations.

15. The measuring device according to claim 14, wherein the processing system is sensing the amplitude and resonance frequencies in the rotational vibration spectrum of the object from the spectral density measured.

16. A method for optically measuring the rotation of an object (2), comprising the following steps:
fastening a cube corner (12) to the object (2), the cube corner comprising reflecting plane faces (14, 14', 14");
fastening a reflecting plane optical interface (13, 23) to the object (2);
directing a collimated incident light beam (8), to the reflecting plane optical interface (13, 23) to form a first reflected beam (15) and, to the cube corner (12) to form a second reflected beam (16) in a direction parallel to the incident direction;
detecting the initial position of the point of impact of the first reflected beam (15), reflected by the plane optical interface (13, 23), on a sensor (18);
detecting the position of the point of impact of the second reflected beam (16), reflected by the reflective plane faces (14, 14', 14"), on a sensor (19);
measuring the respective displacements $\Delta_1$ and $\Delta_2$ of the reflected beams (15) and (16) between an initial position and a measurement position;
calculating an arithmetic function of $\Delta_1$ and $\Delta_2$, said arithmetic function being a function of an arithmetic sum of $\Delta_1$ and $\Delta_2$ divided by a distance D between the cube corner (12) and the sensing system (17); and
deducing a measurement of rotation of the object carrying the cube corner, said measurement of the rotation of the object being free from parasitic rotation $\beta$ from the source-sensor unit.

17. A method for optically measuring the rotation of an object (2), comprising the following steps:
measuring the respective displacements $\Delta_1$ and $\Delta_2$ of the reflected beams (15) and (16) according to the method of claim 10, at a series of measurement instants $t_i$, and
applying a Fourier transform operation to these series of temporal measurements [$\Delta_1$(ti); $\Delta_2$(ti)] to obtain a spectrum of the rotational vibrations of the object as a function of the frequency.

* * * * *